United States Patent
Hoyer

(10) Patent No.: US 7,151,634 B2
(45) Date of Patent: Dec. 19, 2006

(54) ARRANGEMENT FOR TILTING AN ILLUMINATION CARRIER ON AN INVERSE LIGHT MICROSCOPE

(75) Inventor: Carsten Hoyer, Jühnde (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 11/345,685

(22) Filed: Feb. 2, 2006

(65) Prior Publication Data

US 2006/0171024 A1    Aug. 3, 2006

(30) Foreign Application Priority Data

Feb. 2, 2005    (DE) ............ 10 2005 004 680

(51) Int. Cl.
*G02B 21/06* (2006.01)
*G02B 21/00* (2006.01)

(52) U.S. Cl. .......... 359/390; 359/368; 359/385; 359/388

(58) Field of Classification Search ........ 359/368–390; 351/200–247
See application file for complete search history.

(56) References Cited

U.S. PATENT DOCUMENTS

| | | | | |
|---|---|---|---|---|
| 4,210,384 | A * | 7/1980 | Meyer et al. | 359/363 |
| 5,535,052 | A * | 7/1996 | Jorgens | 359/388 |
| 6,690,510 | B1 * | 2/2004 | Kanao | 359/380 |
| 6,898,006 | B1 * | 5/2005 | Hanaoka | 359/390 |
| 2005/0237604 | A1 * | 10/2005 | Kawano et al. | 359/368 |

FOREIGN PATENT DOCUMENTS

| | | |
|---|---|---|
| CH | 616756 | 4/1980 |
| DE | 76 28 471 U | 12/1976 |

* cited by examiner

*Primary Examiner*—Thong Q Nguyen
(74) *Attorney, Agent, or Firm*—Walter Ottesen

(57) ABSTRACT

An arrangement tilts the illumination carrier on light microscopes of the inverse type which include a microscope stand on which an illumination carrier having a light source is attached. The arrangement for tilting the illumination carrier (2) having a light source (3) includes an electric motor (10) with which the tilt movement of the illumination carrier (2) can be controlled in such a manner that the motor-controlled tilting of the illumination carrier (2) takes place manually utilizing an actuating element or can be triggered automatically and is stepwise adjustable. A device for damping the tilt movement is provided.

9 Claims, 2 Drawing Sheets

ARRANGEMENT FOR TILTING AN ILLUMINATION CARRIER ON AN INVERSE LIGHT MICROSCOPE

CROSS REFERENCE TO RELATED APPLICATION

This application claims priority of German patent application no. 10 2005 004 680.0, filed Feb. 2, 2005, the entire content of which is incorporated herein by reference.

FIELD OF THE INVENTION

The invention relates to an arrangement for tilting the illumination carrier on a light microscope of the inverse type. These light microscopes include a microscope stand having integrated optical components for beam guidance and beam deflection. An illumination carrier having a light source is attached to the microscope stand for transilluminating the object which is to be investigated. The object is arranged over an aperture of a microscope stage.

BACKGROUND OF THE INVENTION

Light microscopes of the inverse type are utilized primarily in chemistry, biology and metallography and function for investigating the object lying over an aperture of the microscope stage. The objects to be investigated are here investigated from below. As shown in German publication 76 28 471 U1 and Swiss patent publication 616,756, inverse microscopes comprise a closed housing which is configured as a U-shaped carrying frame. A light source for transillumination of the specimen is mounted on the top side of a housing leg in such a manner that the light source can be adjusted in elevation by means of a knob and a folding back of the carrier with the light source is made possible by means of a hinge.

The illumination carrier arm on inverse microscopes with the light source for transillumination can only be manually tilted to the rear. This leads to limitations and difficulties when working on the microscope especially for not so tall persons. This leads primarily to a limitation of free and ergonomically correct microscope positions of a user primarily for longer durations of work with the microscope. Since these users can only reach the illumination carrier arm when standing, the operator display can, for example, during conventional microscope operator functions, become damaged during the manually undertaken tilting or an unintended displacement of the condenser can occur. During a longer microscope operation, these necessary movements of a user can lead to intense vibrations of the entire stand when standing up so that disturbances or hindrances can occur for complicated configurations with micromanipulators in that, for example, in cell investigations, cells can be destroyed or glass needles can break off. For this reason, and as shown in the publication "Axiovort 200", published by Carl Zeiss AG, two rubber buttons are provided for damping the end position for a tilting of the illumination carrier into the rearward position of the apparatus. When tilting the illumination carrier forward, such rubber buttons cannot be used because no exact stop surface can be defined.

SUMMARY OF THE INVENTION

It is an object of the invention to provide an arrangement for tilting an illumination carrier with the light source for transillumination via which the illumination carrier can be easily and precisely tilted without vibrations and, at the same time, the tilt movement is dampened.

The arrangement of the invention is for tilting an illumination carrier on a light microscope of the inverse type, the light microscope further including a microscope stand having a microscope stage defining an aperture; the microscope stand incorporating integrated optical components for guiding and deflecting a light beam along a beam path; the illumination carrier having a light source mounted thereon for transilluminating an object placed on the stage over the aperture so that the object can be examined. The arrangement includes: a motor for tilting the illumination carrier with the light source relative to the microscope stand; an operator-controlled element for manually or automatically triggering the tilting movement of the illumination carrier; control means for controlling the motor to effect a controlled tilting of the illumination carrier so as to stepwise adjust the tilt movement in response to an input from the operator-controlled element; and, damping means for damping the tilt movement of the illumination carrier.

Advantageously, the electric motor for generating the tilt movement of the illumination carrier is mounted especially on the rearward base body of a microscope stand.

A variation preferred under circumstances for manufacturing reasons provides that the electric motor for generating the tilt movement of the illumination carrier is provided directly in the illumination carrier on the top side of the microscope stand.

Advantageously, the actuating element for triggering the motor-controlled tilt movement of the illumination carrier is provided especially in the forward region of the microscope stand of the inverse microscope and therefore is easily accessible for an operator of the inverse microscope. The actuating element for triggering the motor-controlled tilt movement of the illumination carrier is advantageously configured as an operator-controlled knob.

An especially advantageous embodiment is provided in that the triggering of the tilt movement of the illumination carrier is computer supported. The manual and the computer-supported triggering of the tilt movement of the illumination carrier preferably takes place in different stages and with precise stops.

A further advantageous embodiment is that the damping of the tilt movement of the illumination carrier takes place by means of shock absorbers provided in the illumination carrier. These shock absorbers are especially configured as gas pressure shock absorbers or as spring elements.

What is essential in the arrangement of the invention for tilting the illumination carrier on inverse microscopes is that no vibrations arise when tilting the illumination carrier backward and forward via the controlled motorized tilt movement of the illumination carrier in combination with a damping unit. An operator need no longer stand up during different microscope operations to be carried out in order to tilt the illumination carrier. For this reason, there are also no ergonomic difficulties because of a manual touching of the illumination carrier by an operator and therefore no unwanted disturbances during longer microscoping tasks.

Further advantages arise because of the controlled motorized tilt movement of the illumination carrier in that an improved execution of necessary and conventional microscope functions can be carried out via the realization of precise stops.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
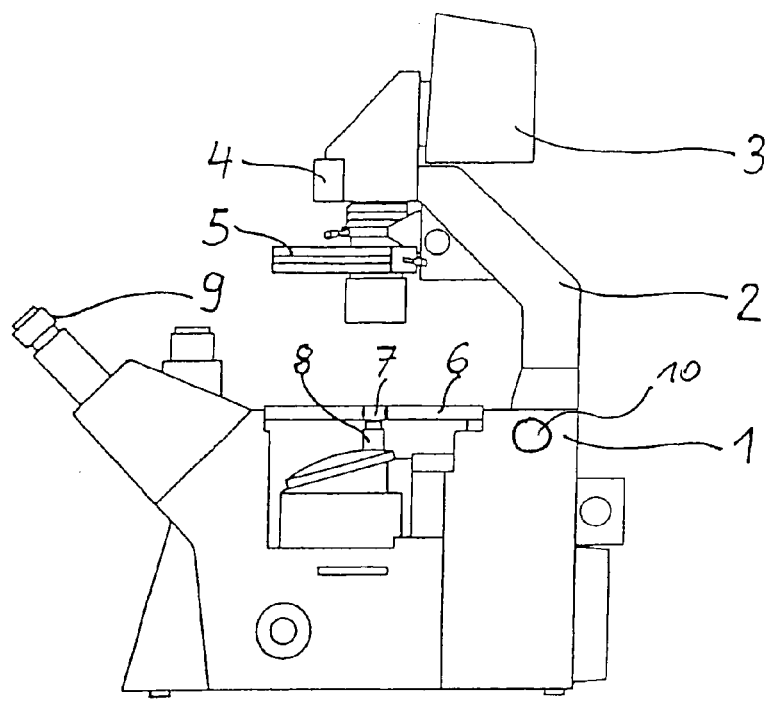
FIG. 1 is a side elevation of an inverse microscope having an illumination carrier with the microscope shown in its base position.
Figure 2:
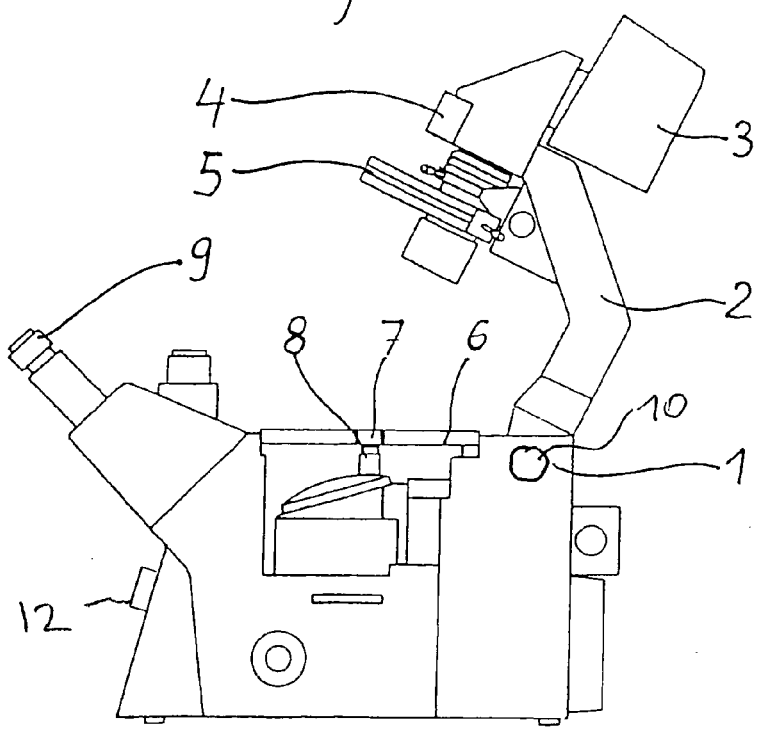
FIG. 2 shows the inverse microscope of FIG. 1 with the illumination carrier in the tilted position.

FIGS. 1 and 2 show a light microscope of the inverse type. The light microscope comprises a microscope stand 1 having integrated optical components for beam guidance and beam deflection. An arm-shaped illumination carrier 2 having a light source 3 is attached to the microscope stand 1 as are an operator display 4 and a condenser 5. These elements are for transilluminating an object which is viewed from below through an ocular 9 via an objective 8. The object is not shown in greater detail and is mounted above an aperture 7 of a microscope stage 6. The controlled tilt movement of the illumination carrier 2 having the light source 3 takes place by means of an electric motor 10. The electric motor 10 is preferably mounted on the rearward base body of the microscope stand 1 for generating the tilt movement of the illumination carrier 2 or the electric motor 10 can be provided directly in the illumination carrier 2. The tilt movement of the illumination carrier 2 is triggered by an actuating element manually or computer supported. The tilt movement of the illumination carrier 2 takes place damped and is stepwise adjustable.

The actuation element for triggering the motor-controlled tilt movement of the illumination carrier 2 is provided especially as an operator-controlled knob 12 on the forward region of the microscope stand 1 of the inverse microscope in combination with other operator-controlled elements and is therefore easily and comfortably accessible for every operator.

Figure 3:
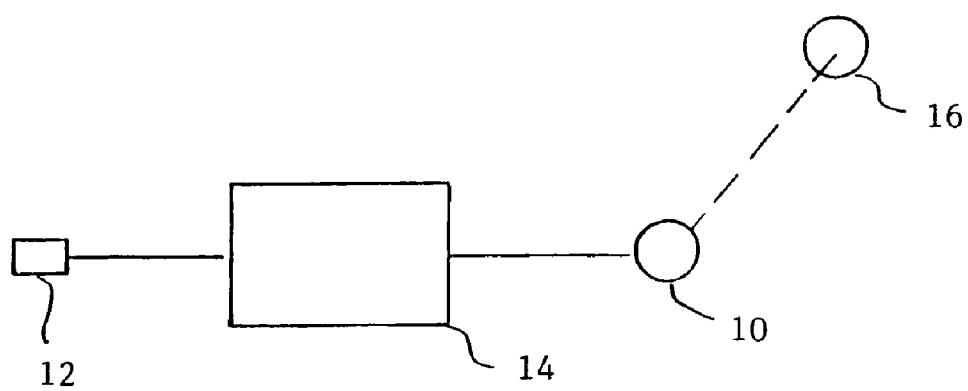
FIG. 3 is a schematic of the circuit for driving the electric motor for tilting the arm-shaped illumination carrier of the inverse microscope shown in FIGS. 1 and 2; and, FIG. 4 is a schematic of a gas pressure shock absorber mounted between the illumination carrier and microscope stand of the inverse microscope shown in FIGS. 1 and 2.

FIG. 3 is a schematic showing an actuating element in the form of the operator-controlled knob 12 connected to computer 14 which, in turn, provides an output signal for driving the electric motor 10. The computer-supported triggering and control of the tilt movement of the illumination carrier preferably takes place in different stages and with precise stops. The electric motor 10 is mechanically connected to a gear assembly 16 for raising and lowering the illumination carrier 2.

The damping of the tilt movement of the illumination carrier 2 takes place by means of shock absorbers provided, for example, in the illumination carrier. The shock absorbers are preferably configured as gas pressure shock absorbers or as spring elements.

Figure 4:
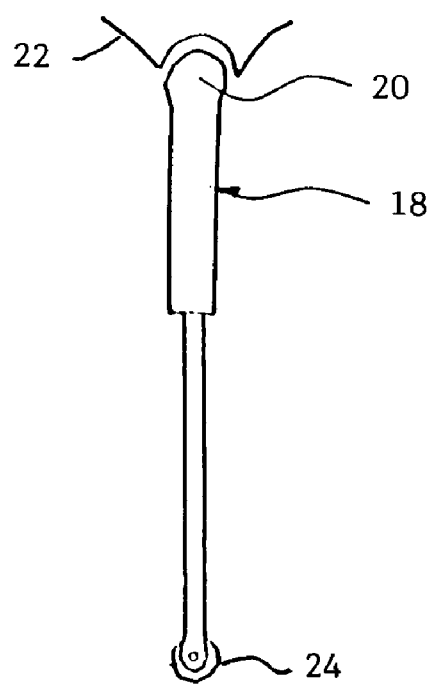

The damping of the tilt movement of the illumination carrier 2 takes place, for example, by means of gas pressure shock absorber 18 shown schematically in FIG. 4 wherein the cylinder end thereof is connected by a ball and socket joint 20 mounted on a support 22 in the illuminating carrier 2 while the other end is a pivot connection 24 mounted in the microscope stand.

The invention is not limited to the embodiment shown but is variable in many ways in the context of the disclosure. Accordingly, the arrangement and configuration of the attachment element for the manual triggering of the tilt movement of the illumination carrier 2 can be provided at different locations, preferably, in the forward region of the microscope stand as shown above.

It is understood that the foregoing description is that of the preferred embodiments of the invention and that various changes and modifications may be made thereto without departing from the spirit and scope of the invention as defined in the appended claims.

What is claimed is:

1. An arrangement for tilting an illumination carrier on a light microscope of the inverse type, the light microscope further including a microscope stand having a microscope stage defining an aperture; said microscope stand incorporating integrated optical components for guiding and deflecting a light beam along a beam path; said illumination carrier having a light source mounted thereon for transilluminating an object placed on said stage over said aperture so that said object can be examined, the arrangement comprising:

a motor for tilting said illumination carrier with said light source relative to said microscope stand;

an operator-controlled element for manually or automatically triggering the tilting movement of said illumination carrier;

control means for controlling said motor to effect a controlled tilting of said illumination carrier so as to stepwise adjust said tilt movement in response to an input from said operator-controlled element; and, damping means for damping said tilt movement of said illumination carrier.

2. The arrangement of claim 1, wherein said microscope stand has a rearward base body; and, said motor is mounted on said rearward base body.

3. The arrangement of claim 1, wherein said illumination carrier has a carrier arm supporting said light source; and, said motor is mounted directly in said carrier arm.

4. The arrangement of claim 1, wherein said microscope stand has a forward portion easily accessible to an operator; and, said operator-controlled element is mounted on said forward portion to facilitate access by the operator.

5. The arrangement of claim 1, wherein said operator-controlled element is an operator-controlled knob.

6. The arrangement of claim 1, wherein said triggering of said tilt movement is computer supported.

7. The arrangement of claim 1, wherein said damping means is a shock absorber.

8. The arrangement of claim 7, wherein said shock absorber is a gas pressure shock absorber.

9. The arrangement of claim 7, wherein said shock absorber is a spring element.

* * * * *